US008788816B1

(12) United States Patent
Spaulding et al.

(10) Patent No.: US 8,788,816 B1
(45) Date of Patent: Jul. 22, 2014

(54) SYSTEMS AND METHODS FOR CONTROLLING DISTRIBUTION, COPYING, AND VIEWING OF REMOTE DATA

(75) Inventors: Douglas E. Spaulding, Westminster, CO (US); Kenneth A. Jamison, Jr., Loveland, CO (US); Jeffrey D. Elliott, Denver, CO (US)

(73) Assignee: EJS Technologies, LLC, Westminster, CO (US)

( * ) Notice: Subject to any disclaimer, the term of this patent is extended or adjusted under 35 U.S.C. 154(b) by 0 days.

(21) Appl. No.: 13/365,084

(22) Filed: Feb. 2, 2012

Related U.S. Application Data

(60) Provisional application No. 61/438,858, filed on Feb. 2, 2011.

(51) Int. Cl.
*G06F 21/62* (2013.01)

(52) U.S. Cl.
USPC .......................................................... 713/165

(58) Field of Classification Search
CPC ................ G06F 21/6218; G06F 21/10; G06F 2221/2107; G06F 21/6209; H04L 63/0428
See application file for complete search history.

(56) References Cited

U.S. PATENT DOCUMENTS

| | | | | |
|---|---|---|---|---|
| 6,522,268 B2 * | 2/2003 | Belu | ................................ | 341/51 |
| 7,127,088 B1 * | 10/2006 | Grajewski et al. | ............ | 382/124 |
| 7,653,632 B2 * | 1/2010 | Smith | ...................... | 707/999.01 |
| 7,836,311 B2 * | 11/2010 | Kuriya et al. | .................. | 713/185 |
| 8,086,688 B1 * | 12/2011 | Bacastow | ...................... | 709/213 |
| 8,365,081 B1 * | 1/2013 | Amacker et al. | .............. | 715/748 |
| 2007/0011469 A1 * | 1/2007 | Allison et al. | ................ | 713/193 |
| 2007/0033149 A1 * | 2/2007 | Kanngard et al. | .............. | 705/65 |
| 2008/0037789 A1 * | 2/2008 | Motohashi | .................... | 380/277 |
| 2008/0279534 A1 * | 11/2008 | Buttars | ........................... | 386/94 |
| 2009/0031128 A1 * | 1/2009 | French et al. | ................. | 713/164 |
| 2009/0254572 A1 * | 10/2009 | Redlich et al. | .................. | 707/10 |

(Continued)

OTHER PUBLICATIONS

Manes, Dr. Gavin, "How to Protect Yourself, Your Children, and Your Business When Using Social Media," NALS, Inc., http://www.nals.org/?p=2544, posted on Feb. 14, 2011, three pages.

(Continued)

*Primary Examiner* — Farid Homayounmehr
*Assistant Examiner* — Sanchit Sarker
(74) *Attorney, Agent, or Firm* — Lewis, Rice & Fingersh, L.C.

(57) ABSTRACT

Systems, methods, software, computer implemented methods, and file formats that allow for the creator of a file to place constraints on a file prior to transmitting it which generally allow the owner to have greater control over the use of their data after it has left their possession. These systems and methods also allow for ongoing control of digital data which allow for a sender to delete files that have been sent, to delete copies, and to generally control data that has left their private machine through the use of multi-layer encryption.

17 Claims, 2 Drawing Sheets

(56) References Cited

U.S. PATENT DOCUMENTS

| | | | |
|---|---|---|---|
| 2010/0145904 A1* | 6/2010 | Riviello et al. | 707/608 |
| 2010/0146258 A1* | 6/2010 | David et al. | 713/150 |
| 2010/0205586 A1* | 8/2010 | Mun | 717/140 |
| 2010/0250497 A1* | 9/2010 | Redlich et al. | 707/661 |
| 2011/0126006 A1* | 5/2011 | Dowdy et al. | 713/165 |
| 2011/0252232 A1* | 10/2011 | De Atley et al. | 713/165 |
| 2011/0252234 A1* | 10/2011 | De Atley et al. | 713/165 |
| 2012/0004960 A1* | 1/2012 | Ma et al. | 705/14.4 |
| 2012/0110323 A1* | 5/2012 | Colclasure et al. | 713/153 |
| 2012/0124143 A1* | 5/2012 | Chung et al. | 709/206 |
| 2012/0124613 A1* | 5/2012 | Reddy et al. | 725/27 |
| 2012/0217570 A1* | 8/2012 | Kim | 257/324 |

OTHER PUBLICATIONS

Conley, Chris, "The Right to Delete," http://www.aaai.org/ocs/index.php/SSS/SSS10/paper/view/1158/1482, undated, pp. 53-58.

* cited by examiner

SYSTEMS AND METHODS FOR CONTROLLING DISTRIBUTION, COPYING, AND VIEWING OF REMOTE DATA

CROSS REFERENCE TO RELATED APPLICATION(S)

This Application claims the benefit of U.S. Provisional Patent Application Ser. No. 61/438,858, filed Feb. 2, 2011, the entire disclosure of which is herein incorporated by reference.

BACKGROUND

1. Field of the Invention

This invention relates to control of digital data. Specifically, it relates to systems and methods which allow for a holder of digital data to provide data to a third party subject to preexisting constraints on its use, and to alter those constraints after the file has been transmitted.

2. Description of Related Art

In today's world, the average user stores a huge amount of their life, and particularly their private life, in digital form. This can include everything from private diary entries, to photographs, to financial information. It is relatively easy for the consumer to protect this data when it is located on a private machine in a private residence. Generally, in such a situation physical access to the machine on which the data is stored is required and password systems to inhibit unauthorized users from turning a machine on are common. Even if the machine is connected to the outside world by a network, these computers can still be protected through the use of commonly available security software, hardware based firewalls such as those available with home routers, or by simply turning a computer off when it is not physically in use.

Even with the available security, however, the consumer generally has no control over files that they send to someone else once the data in those files leaves their private machine. Because of the nature of digital machines, virtually every time a file or other piece of digital data is transferred, it is copied. While certain products exist which attempt to defeat interception of private communications during the communication process (such as secure websites and public key encryption), these systems suffer from two fatal flaws. The first is that they are often relatively difficult for the private entity to use unless security is a major concern for them and second, they make no provision for the handling of the file once it has been obtained by a legitimate receiver.

This inability of the sender to control viewing, copying, forwarding or other use of a file by the receiver has proven to be a problem in a variety of areas. In the first instance, it means that secure documents, once they leave a first machine, are effectively no longer secure as they can be copied and passed on again without the sender ever knowing. Secondly, as social networking, and the barrage of constant personal information being updated to sites such as Facebook™ and Twitter™, has become more common, those who post personal information can have it copied, archived, and maintained even if they have deleted it and expect it to have been destroyed.

News reports are rife with stories of people's information being copied for illegitimate purposes. This can include concerns such as the use of baby pictures posted to social networking sites appearing in falsified adoption offers and posts of confidential and trade secret documents on WikiLeaks™ and related sites. Even outside of purely illegal uses, private pictures of celebrities have a habit of getting posted to public places and leaked to the news media resulting in embarrassment and occasionally damage to reputation.

In the legal arena, the recent explosion in "e-discovery" issues related to capturing of stored digital data has made litigation more expensive and also further exposed the issue of how difficult digital data is to destroy, even when done so for a legitimate purpose. These concerns have resulted in many people being afraid of providing family members and other legitimate users access to digital data because they don't know who could access, view, or copy it without them knowing and it coming back out later. Essentially, virtually anything created on a computer and stored on a network is permanent and may be found at a later date assuming sufficient resources are committed to finding it and it's been placed, at some time, sufficiently out of the original creator's control. Thus, once a sender has placed data on a machine outside their direct control, it's essentially impossible to control what happens to it, who sees it, and to what purposes it is placed. The ability to eventually obtain stored data has even spurred legal argument that a user be provided with a legal "right" to delete their data (specifically to disallow its use as evidence or discovery in legal proceedings), potentially even if the data is still persistently stored and actually in existence.

Not only can the inability to control digital data result in cases where the data is taken by a third party without the sender's knowledge, it can also result in potentially problematic actions by a legitimate receiver. For example, a common practice among teens currently (with up to 50% admitting to being involved in the practice) is "sexting." This generally involves the sending of nude or semi-nude pictures of oneself to a boyfriend or girlfriend in a playful, teasing, fashion. The practice is also presumably carried out by adults for similar reasons, but that is generally not seen as being as problematic. While the practice could be considered anything from undesirable promiscuity to simply playful flirting with modern technology depending on social mores, the practice can result in some very problematic outcomes. The concern from the practice is often not so much the original transmission, as this is often between a sender and receiver that consent to the practice and may be no different to what they are doing outside of the digital communication realm, but the possibility of the photo being inadvertently or intentionally passed on.

Specifically, in order to make sharing of information with friends easier on social networks, some devices can be programmed to automatically post saved pictures from a mobile device to a social network account. In this situation, these pictures can then get posted to public sites resulting in at least embarrassment and often legal liability or even criminal threat. Further, the pictures, once sent, are often shared by the legitimate user with friends (in fun or in malice) and may continued to be passed on without the sender knowing.

The dangers in this connectivity are therefore that a picture sent in play by a person who didn't realize the implications, is suddenly available publicly and is often treated by others in a very different way than it is treated by the original recipient. Further, when this happens, even if the sender would like to retract the picture (or would at least like to prevent further distribution), they have no way to do so. Thus, it is an activity that once done, can never be retracted, expunged, or otherwise eliminated. While there are services that can be purchased that will search and attempt to expunge rogue files from the Internet to try and curb the issue, there is no way to insure that all copies have been deleted as copies may still be locally stored on computer systems which either cannot be accessed or are no longer connected to a network. These remaining files can then create a whole new set of copies.

While sexting is an extreme example of highly personal information being passed on, there are many other examples which are less extreme but just as damaging. Many teens and college students will post pictures to friends (such as on their Facebook™ account) which may show them at parties, drinking, or even carrying out illegal activities. While these are often not problematic prior to graduation and often include perfectly legal and acceptable behavior in the situations during which the pictures are taken, those same pictures are often not desirable to be seen by potential employers or in situations where such behavior may be considered as compromising. While many individuals take care to delete the pictures from public sites and segregating their personal from professional life, if these pictures ever got copied to locations outside their personal control, those pictures may still be available and can easily cross from personal to professional situations.

SUMMARY

As can be seen above, in an increasingly connected society that has begun to communicate in pictures and text more than the spoken word, today's modern technological tools make it incredibly easy for a recipient of a photo, or in fact any digital file, to instantly copy and pass it along. Recent legal issues involving copyrighted music have shown just how difficult it can be for the content creator to control their work once they have made an original, legitimate, transfer to a third party even when they have access to sophisticated Digital Rights Management (DRM) mechanisms and clear legal recourse. The standard consumer with a smart phone or computer connection will generally have no such access or clear legal rights and has little recourse to protect themselves, or others, from what might have been an accidental action. Thus, there is a need to provide the less sophisticated security consumer access to systems and methods that can provide for the ability to maintain some control over transmitted data.

Because of these and other problems in the art, what is described herein are systems, methods, software, computer implemented methods, and file formats that allow for the creator of a file to place constraints on a file prior to transmitting it which generally allow the owner to have greater control over the use of their data after it has left their possession. These systems and methods also allow for ongoing control of digital data which allow for a sender to delete files that have been sent, to delete copies, and to generally control data that has left their private machine.

There is described herein a method for creating an encrypted computer file, the method comprising: providing a source file to a sending component on a first computer; the sending component attaching metadata to the source file where the metadata identifies specifics about how the source file may be used; the sending component encrypting the source file using a first key; the sending component encrypting the metadata using a second key; and the sending component combining the encrypted source file, the encrypted metadata file, the first key, and the second key into a secure file in accordance with an algorithm.

In an embodiment of the method the first key is combined with the metadata prior to the metadata being encrypted.

In an embodiment of the method the secure file is password protected.

In an embodiment of the method the metadata includes a limitation on the number of times the source file can be opened, a limitation on the time when the source file can be opened, a limitation on the location where the source file can be opened and/or prohibits making a copy of the source file.

In an embodiment of the method, when the secure file is decrypted by a receiving component using the second key, if the criteria of the metadata is not met, the receiving component does not retrieve the first key and may delete the location of the first key from the secure file.

In an embodiment of the method the source file comprises an image.

In an embodiment of the method the encryption is AES 256 bit encryption.

There is also described herein a method for providing secure digital communication, the method comprising: providing a source file to a sending component on a first computer; the sending component attaching metadata to the source file where the metadata identifies specifics about how the source file may be used; the sending component encrypting the source file using a first key; the sending component encrypting the metadata using a second key; the sending component combining the encrypted source file, the encrypted metadata file, the first key, and the second key into a secure file in accordance with an algorithm; the first computer transmitting the secure file to a second computer; a receiving component on the second computer receiving the secure file; the receiving component utilizing the second key to decrypt the metadata; if the specifics about how the source file may be used are currently met, the receiving component retrieving the first key and decrypting the source file; and the receiving component displaying the source file in a framework which does not allow the specifics about how the source file may be used to be violated; if the specifics about how the source file may be used are not currently met, the receiving component losing the second key.

In an embodiment of the method the source file comprises an image.

In an embodiment of the method the metadata includes a limitation on the number of times the source file can be opened, a limitation on the time when the source file can be opened, a limitation on the location where the source file can be opened and/or prohibits making a copy of the source file.

There is also described herein a computer readable memory comprising: computer readable instructions for obtaining a source file; computer readable instructions for attaching metadata to the source file where the metadata identifies specifics about how the source file may be used; computer readable instructions for encrypting the source file using a first key; computer readable instructions for encrypting the metadata using a second key; and computer readable instructions for combining the encrypted source file, the encrypted metadata file, the first key, and the second key into a secure file in accordance with an algorithm.

DESCRIPTION OF THE PREFERRED EMBODIMENT(S)

Figure 1:
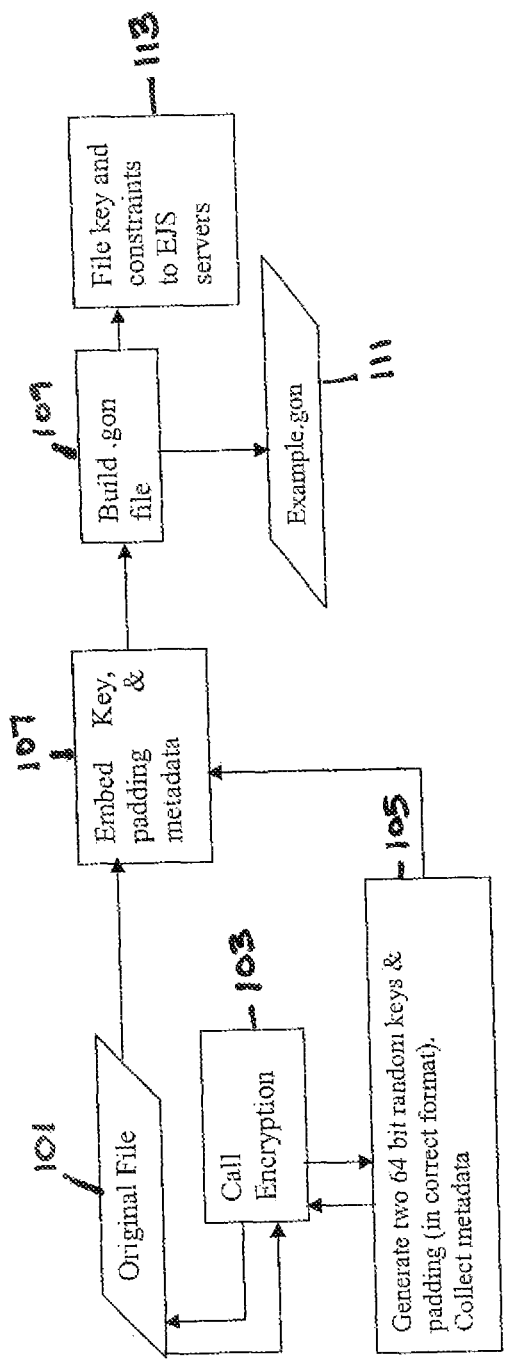
FIG. 1 provides a flowchart showing the creation of a secure file.

Generally the systems and methods discussed herein will comprise computers or other processors (or will operate on such devices) and will often involve the use of "smart phones" or similar mobile computing and communication devices. The systems and methods will usually be incorporated into software (such as, but not limited to, what is currently referred to as smart phone "apps") that comprise self contained software components placed on one of these devices. In alternative embodiments, one of ordinary skill would understand that the software functions discussed herein could be provided through appropriate hardware arrangements and the functionality may be implemented on any form of computer device.

The methods discussed herein also can be computer implemented and may be embodied as instructions on computer readable memory (whether local or remote to the relevant device) to have a processor or other computer device (specifically including, but not limited to a "smart phone") carry out the contemplated actions. Further, while the below generally contemplates that the software have components for sending and components for receiving files which would be located on two disparate machines, it should be recognized that each machine may have both capabilities and simply be acting in the capacity of one or the other with regards to any particular transaction.

In an embodiment, the original data files will be placed into a new file type with the file extension indicating that they comprise controlled data prior to transmission. This file type is created on a first computer or other processor and is transmitted to a second computer or processor. Once received, the file is accessed in a way that inhibits the receiver from carrying out actions not allowed by the sender on his/her computer. The data in the file is maintained in the new file format on all machines which receive it via a transmission, and it is therefore very difficult for the receiver to pass on the file in a different format that is not detected by the software for accessing it. The software can delete the material if the access was not allowed in the sender's initial setup of rights.

While it is generally preferred that the data be created in a native format and then encapsulated into a secure carrier format, in an alternative embodiment, existing file formats may be modified to allow them to interact with the systems and methods for controlling their management. Effectively, the systems and methods discussed below can be incorporated into existing data creation and transmission systems that eliminate the need for separate software. While this is generally preferred as it renders the transmission methodology as a whole generally more secure, separate software does not require adoption of a standard by the entire digital content industry, and will generally be much easier to implement on a per user basis.

In the present format the file metadata (data about the data) will contain the restrictions placed on the file and allow the receiver to view files only when meeting desired constraints of the sender. Effectively, the file comprises a composite of the original data and data on how to access the original data. This file is then provided in a format where the data is very difficult to access without inside knowledge of how the file was created. Basically, the file is locked and a key, which is not readily obtained, is needed to open the file and view or otherwise access the contents.

Control over the file will generally be obtained through the use of encryption technologies whereby the file is transmitted, received, and maintained only in an encrypted form. It is generally recognized that no form of encryption is immune to being broken. However, most computer users lack the time and resources necessary to break into an encrypted file. Further, even if they do have the resources, such brute force methodology can potentially be detected and is often illegal. Thus, while this disclosure discusses systems and methods for protecting data, the protection should not be considered foolproof or absolute.

Further, in the digital world, true file "deletion" generally doesn't exist. Once a file is created, the file resides on the machine until all the memory in which it is stored is overwritten, and often even then fragments of the data remain which can be pieced back together. This generally does not occur at a single instant or at the time the "delete" key is pressed. Instead, once data is indicated to be deleted, the data is simply not protected from being overwritten, and the overwrite occurs over time. While the present application discusses "deleting" "destroying" or "damaging" a file, it is recognized that this will generally not remove the data in the file from the machine. Instead, it will generally be the case that the file, which is stored in an encrypted form, will be difficult, if not impossible, to decrypt. Specifically, decryption would require sophisticated software and generally keys to the encryption cipher that are not easily obtained and not easily determined.

Thus, while this disclosure will generally contemplate or refer to the "deletion" of data, it should be recognized that data is not necessarily destroyed or removed from the system in the same manner that a paper document may be physically destroyed. Instead, a "deleted" file, as that term is generally used herein, will mean that the file is not generally accessible, and may be totally inaccessible to an unauthorized user. Specifically, a user's access to the file would have to be, at best, expressly granted by the owner of the file, or via legal process, and would otherwise be considered generally inaccessible to an unauthorized user even though the user is in control of the file itself, or a copy of it. In an embodiment, the file may be inaccessible even if such grant or process was employed and the file could only be retrieved through highly advanced (and computationally intensive) code-breaking mechanisms. As access to such advanced decryption technology is generally tightly controlled, it will generally be the case that such a file would truly be destroyed (that is completely unusable) except in very extreme circumstances, and even then only in certain specific situations. The easiest way to therefore indicate that a file is "deleted" is that the file does not have any meaningful value to a user of the machine accessing it. In other words, it is no longer human readable.

Opening of the encrypted file will generally require use of a specialized software or software component which will open an embedded file in a manner subject to the constraints on the embedded file which are placed within the original metadata of the encapsulating sent file. Basically, the file can only be easily opened (decrypted) by a specific piece of software which is designed to only open the file in accordance with preset allowed uses of the file. Thus, the underlying file could be "copied" in its encrypted form, but that file may be difficult, if not impossible, to open without abiding by the original constraints placed on it by the sender. The file may also detect that it is a copy and the copied version may act to disable itself further or may damage itself if it detects an unauthorized piece of software trying to open it. As the receiving system can default to damaging/destroying the file if all conditions for opening are not acceptable, the system provides for secure transmission and storage of digital files.

Known encryption methodologies, such as, but not limited to, PGP and RSA work well for corporations but are too cumbersome for widespread use in the consumer market. This system is preferably designed in a modular nature allowing for easy manipulation of the embedding methods if any of them are compromised. The intent is to place a locked front door on data. Government agencies and law enforcement may be able to break into files if necessary (and appropriately authorized) with the amount of resources available to them. However, most of the consumer market has no access to the expertise or hardware required to circumvent these processes and break into the original data.

Further, in an embodiment, the server system which maintains the system generally does not hold any source file data. It simply holds information on how to decrypt certain secure files. The general intent is to not store user data in any machine other than the senders' machine in a non-encrypted form. Further, even if remote storage of encrypted data occurs and decryption keys are also stored, they will generally be stored separately and in a fashion that connection between the two is difficult. Effectively, the senders will be able to place constraints on usage of the data that will generally have to be followed for the file to be opened. Further, once the file has been "consumed," the file will not persist or at least not persist in a decrypted form which can be easily read by any other software application.

An embodiment of a method for the creation of a secure file is shown in FIG. 1. In this embodiment, a user is working on an original source file (101). The source file (101) is first pulled into a sending software component of the secure system and method. The original source file (101) may be a source file on the computer, or may be pulled straight from a connected (via wired, wirelessly or a network) device (for example a digital camera) or may be sent directly to the sending software component via the connected device. This sending component is used to encapsulate the original file and create a secure file for transmission. In an embodiment, the software and systems will utilize AES 256 bit encryption or other encryption methods or protocols known now or later discovered. Each source file (101) (that is the photo, text, or other data file that is to be transferred using the system) will first be loaded into the sending component to indicate that the source file (101) is to be source material for the system. The sending component then calls (103) the selected encryption methodology or program and the source file (101) is encrypted using the encryption methodology selected (105), metadata associated with the source file (101), including user identified parameters about authorized use of the source file (101) which are entered at this time, will be separately encrypted (103) with a different key. Both keys, metadata, and padding (random data designed to foil attempts to obtain the keys via unauthorized methods) will be embedded into a secure file (107), using an identical character set, in accordance with a mathematical algorithm that will merge the source file (101) with the metadata and key file.

While the above embodiment specifically contemplates software based encryption methodologies as those are generally platform independent and therefore more useable on a wide variety of devices, it should be recognized that in an alternative embodiment, the systems and methods may utilize hardware based encryption and decryption, including, but not limited to an encryption processor or encryption PCI card that would handle the encryption and decryption steps which are often processing heavy. While such a solution is generally not practical or economic for casual users, specialized machines that have a primary function of encrypting and decrypting files would benefit from specialized hardware and such systems may be preferred for highly sensitive data such as military secrets where such hardware may not only be available, but commonplace. As software, the system can comprise a computer readable memory device such as, but not limited to, a hard drive, solid state memory chip, read only memory (ROM), or random access memory (RAM) including computer readable instructions for an associated processor or computer to execute the instructions and therefore act as the sending component or the receiving component. In alternative embodiments, these components may be supplied as software in a separate machine or as hardware components.

The encryption algorithm will generally be maintained as a secret of the system manufacturer and developer so that methodologies for retrieval of the key are not known to the general public. It can also be changed over the course of time to further enhance security. However, law enforcement, anti-terrorism, or other institutions that can present a legitimate need to access private data can be provided either with tools to access the source file (101), or by the developer with the source file (101) they have decrypted.

The embedding action will build (109) a secure file (111) to be transmitted. This secure file (111) is then stored and/or transmitted. The secure file (111) will generally be transmitted with a wrapper file which will contain instructions for recording aspects of the transmission and instructions on how to obtain keys to open (decrypt) it. Specifically, the wrapper may collect a cellular tag to an active tower collecting date & time stamps in an embodiment. Keys and related items for successful decryption may be sent to a secure server for later access when it is time to decrypt the file (113). Further server calls can be made to deliver file information and retrieve keys and instructions for dismantling the secure file (111) which may also be stored on the remote secure server. The secure file (111) may also include a unique ID for the file which definitively identifies it should there be a desire for the sender to later alter the viewing of the source file (101), or to identify copies that were made from it.

Thus, at the time the secure file (111) is transmitted, the secure file (111) effectively comprises a shell or container (wrapper) which includes the transmitted file (file data) in an encrypted form, metadata in encrypted form, padding, and keys for decryption. The keys are masked and appear as simply part of the encrypted data. Further, all the above data, will be mixed together (which specific components belonging to which file not being clear) so that the secure file (111) appears not as a file containing four separate components, but as a single encrypted file. This is variably termed "multi-level," "multi-layered," or simply "layered" encryption. Because the secure file (111) includes multiple files and data (some encrypted and some not) mixed together, standard attempts to obtain decrypting keys and unlock the source file (101) will often be unable to parse the separate information and will be defeated by the file format. Thus, without access to knowledge on how to locate the decryption keys, the source file (101) will generally be unreadable.

It should be recognized that, in a further embodiment, a secondary method of authentication, for example, via a hidden user-set password not sent with the file and/or MAC address verification can be used to open the secure file (111) initially. This type of security may be a common "human" type password, PIN, or other memory or device based security as is currently available for most file transfers. This would simply provide one further level of security to the source file (101).

Generally, the secure file (111) will contain general information on how the secure file (111) was put together as well as a pointer to a methodology for decompiling the first key and accessing the metadata which will generally be decrypted first. Specifically, in the secure file (111), there will often be included a date/time stamp, nanosecond reading, equation selection, user constraints, and similar information related to the specific source (101) file creation and control elements. The remaining secure file (111) will generally include a date/time stamp, version of the software used to create the file, associations, server/cell call instructions, and like verification commands. Date/time stamps will generally be maintained in various places in different formats to make sure that components are verified as being connected prior to the source file (101) being allowed to open. Generally, if date/time stamps (or any other feature) shows the possibility of outside manipulation, the secure file (111) will generally be destroyed when opening is attempted and before allowing viewing of the source file (101) (or even attempting its decryption). In this way, the system will default to a safe mode (delete the file) to inhibit it being viewed by unintended parties.

Figure 2:
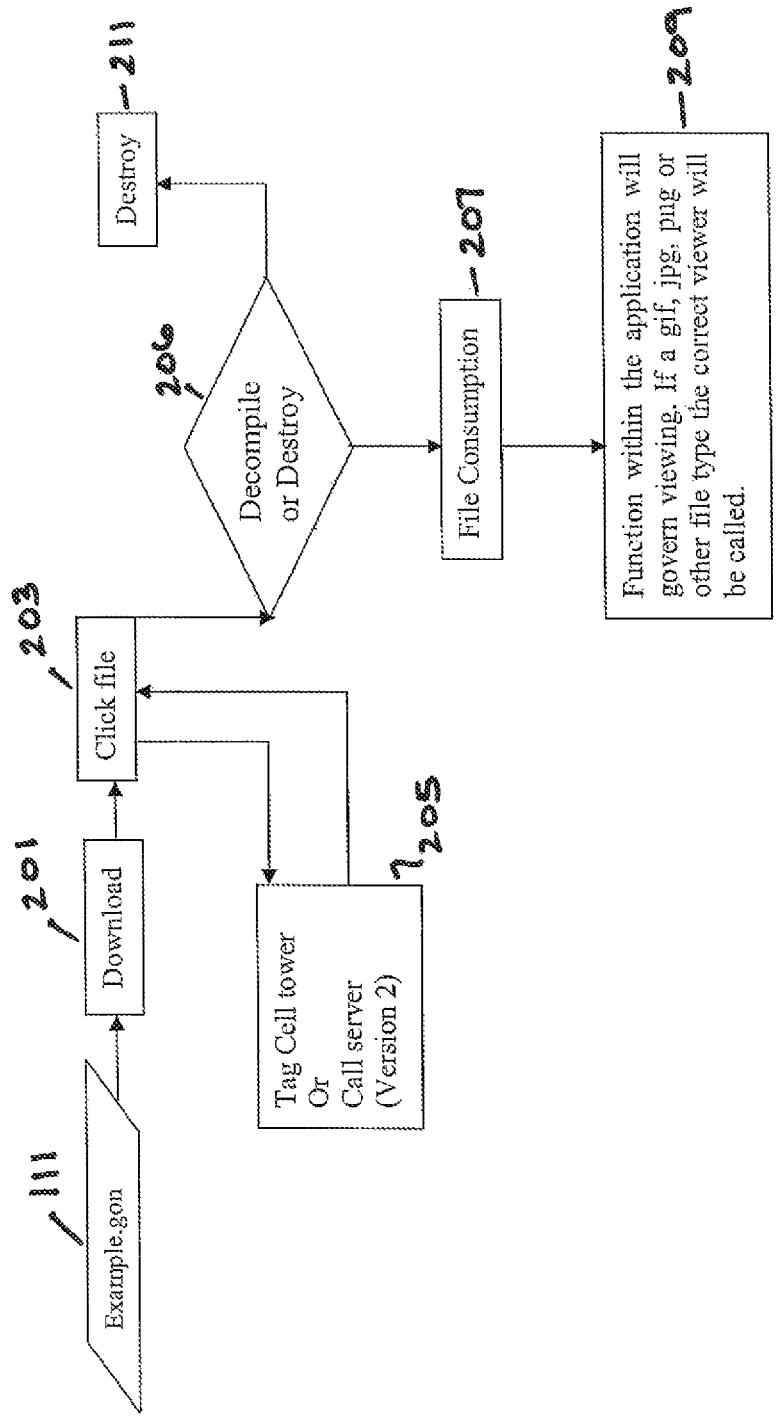
FIG. 2 provides a flowchart showing access to the source file from a secure file.

The secure file (111) created by FIG. 1 is generally what will be sent between the sender's and receiver's systems via common protocol such as email or ftp. Receipt and decryption of the secure file (111) is shown in FIG. 2. Once received at the receiver (201), secure files (111) will be consumed by the receiving software, indexed, and stored in multiple files on the users file system to further prevent copying as the file data is difficult to locate in order to pull component parts together other than through the receiving software. In order to view the contents of the source file (101), the secure file (111) will be loaded into a specialized program or other operational component of the system at the receiver's end which is designed to decrypt carrier files (called "receiving software").

This receiving software provides a shell which serves to provide a variety of functions at the receiver's device. In order to provide additional security, the secure file (111) may be further protected by additional known security measures outside of the present systems and methods. For example, the already created secure file (111), may be additionally encrypted, require the receiver to enter a password to open the file, or be transmitted using certain known, or future discovered, secure transmission formats. The sender would generally select these options and communicate through other methods the password or other information known to access the secure file (111) in a format that can be read by the receiving software.

In the first instance, one of the general facets of the receiving software is that the process of decryption does not actually create a stored version of the decrypted file. Instead, when access to the file is desired (203), the receiving software will perform all necessary checks (205) to make sure the secure file (111) appears to have not been tampered with. The receiving software serves merely to present the subject matter of the source file (101) and does not actually create an unencrypted version. In this way, there is no decrypted file stored which other software could open. In an embodiment, security could be further enhanced by the secure file (111) being deleted by the act of opening the source file (101). That is, when the receiving software opens the source file (101), it also overwrites, loses, or otherwise disables access to the encryption key. In this way, the source file (101) exists solely within the receiving software once opened and is deleted automatically upon expiration or closing of the receiving software.

Assuming access to the file is allowed (206), the receiving software will open (207) the source file (101). If there are any problems, the receiving software will generally destroy the secure file (111) making decryption even more difficult (211). This can comprise losing essential elements of the decryption keys or overwriting parts of the secure file (111) essential for it to be decrypted. As part of the opening process, the receiving software will generally interface with conventional file handling software (209) and similar programs. These can be designed to view and/or edit files of particular types and include, but are not limited to, programs such as Adobe Acrobat™, Microsoft Word™, AutoCAD™, and iPhoto™.

The conventional programs are utilized through the receiving software for a couple of reasons. First, by running the conventional programs through the receiving software, the source file (101) is not actually placed into a remote program for purposes of viewing. Thus, the file, in a decrypted form, does not exist outside the system. Instead, the source file (101) is simply viewed in a native format through the receiving software. Secondly, most conventional file viewers include provisions to save, copy, forward, and otherwise utilize files that they open. Even if files are sent in a protected format (for example being write protected), once the file is opened, these conventional file handling systems often include functionality to disable that protection. By having the conventional programs open within the framework of the receiving software, the receiving software is able to disable these features effectively converting the native software to a pure viewing function. Thirdly, as the source file (101) is viewed in a native format, functions which are not disabled, can generally still be utilized and the file is presented in an expected form without need for the receiving software to mimic the capabilities of the conventional software designed for use with this file type.

In an embodiment, as part of the opening process, the receiving software will generally interface with conventional file types using published file specifications to open files in a self contained viewing environment (209). These can be designed to view and/or edit files, depending on the embodiment, and may interact with files of many different published file types including, but not limited to, text (.txt), JPEG (.jpg), Microsoft Word™ (.doc or .docx), Apple QuickTime™ (.mov), Microsoft Excel™ (.xls), Adobe Acrobat (.pdf), or audio video interleave (.avi).

Thus, the common format of existing data manipulation programs can be used by the receiving software without need to modify the underlying software of the product used as a viewer, while the receiving software still disables the viewer's and receiver's ability to copy, modify, or transmit the source file (101). Thus, the receiving software does not allow for copying, modification, screenshots, or other methods of creating unauthorized copies of the source file (101) because it has purposefully disabled those functions when it allowed the source file (101) to open.

As can be seen, the format allows for remote control as the source file (101) can generally not be accessed without use and verification of the secure file (111), of which it is part, by the receiving software and a portion of that access includes loading the allowed rules of access. Further, the receiving software is generally bound to only allow viewing of the source file (101) in a manner consistent with the sender's stated controls (from the metadata component of the secure file (111)). In this way, the sender's controls are obeyed by the receiving machine.

It should be apparent that within the above framework, a variety of further features can be provided in different embodiments of the invention. In particular, the methods can be implemented to provide different types of controls over the source file (101) content. For example, as discussed above, the secure file (111) can be deleted upon the secure file (101) being opened. Effectively, the only version of the file (once opened) is held in soft memory and therefore is erased when it is closed. This provides for particular security as even if the decryption methodologies were captured when the secure file (111) was opened, they cannot be utilized again as the secure file (111) on which they operated no longer allows it.

Alternatively, the sender can set specific viewing criteria for the document. For example, they can indicate a total number of times the source file (101) can be opened before it is deleted (which could be anywhere from once to infinite (no planned delete)). The sender could alternatively provide a fixed amount of time that the source file (101) could be opened for. This could be based on a total accumulated time open, could be based on a time open in each session, or could be a combination of the above. The sender could also choose which file handling functions are to be allowed or disabled. Thus, the sender may allow the source file (111) to be copied, but only as part of another secure file (111). In the event that the copy is sent to a different receiving software (a different device), that copy is disabled from being opened.

Still further, the secure file (111) could be set to delete after a particular period of time has elapsed. Thus, the secure file (111) may effectively have a usable life where it will delete at a particular date or a certain number of days after it has been transmitted. It may also only be accessible within a certain time window or on a certain day (for instance the file may be viewable only on Jan. 1, 2011, for one hour starting at 1:00 pm).

In addition to the system allowing a sender to set their original controls on the secure file (111), the sender may also, in an embodiment, update these over time. The most obvious of these is that a delete request may also be sent by the original creator. In this case, prior to the source file (101) being decrypted, the receiving software will determine if the secure file (111) is tagged for delete. As contemplated by FIG. 2, as part of verification of the secure file (111), the receiving software can contact a remote secure server for instructions and keys as well as to verify the integrity of the secure file (111). As part of this call, if the sender altered instructions on the secure file (111) since it was last accessed, these can be sent with the update and stored with the existing secure file (111). In an extreme option, this can instruct the secure file (111) to delete without opening the source file (101) at this instance. Thus, the sender can effectively remotely delete the secure file (111) on the receiver's machine. If this is the case, the secure file (111) is deleted and the source file (101) is never opened. This option is particularly valuable in the event that a user mis-sent the original file (e.g. they allowed a function they did not wish to) and now wants to make sure the source file (101) cannot go outside their constrained controls.

Similarly, as each secure file (111) can be uniquely identified, and that identifier can carry information about the original source file (101) carried within it, a secure file (111) which has been legitimately copied (or made from a copied source file (101)) can also be sent a delete tag as being identified as a copy containing the same source file (101) as one which has received a delete tag. In effect, the sender can control how the original parent secure file (111) is handled, as well as how child secure files (111) are also handled. Such control can also be originally input to allow for limited copying or modification.

Alternative embodiments can also alternatively or additionally provide for other security functions. As contemplated above, the encryption key is generally embedded as part of the secure file (111). Alternatively, the system could utilize a key which is not part of the file (either alternatively or additionally). This key could be stored on a central storage for keys that would sit behind a corporate firewall. The secure file (111) would need to be able to access the key before they could decompile the source file (101).

While the above is focused on options for deleting the secure file (111) and/or the source file (101) contained therein, the system, both at the encrypt and decrypt level, will allow for the receiver of the secure file (111) to have options on using the secure file (111) as well. In an embodiment, the receiver can be provided with a list of files that can be viewed and may also tell them the expiration of files. E.g. they may know that a secure file (111) will expire at a certain time, after being viewed for so much longer, or after being viewed so many more times. The system may also allow for the receiver to remove the source files (101) from the secure file (111) in certain instances (e.g. where the sender allows it). For example, in some situations, the sender may be willing to allow the resultant viewer to maintain an unsecured copy of the source file (101), should they desire, because the secure file (111) in this case was used solely to secure transmission of the data.

Because the sender will generally continue to maintain control over the data once it is sent, alternative embodiments of the receiving software can also allow for communication about the data to the original sender. For example, the sender can be made aware of when (and if) the source file (101) is viewed. They may also be told which device of the receiver was used to open the secure file (111) if it is available to be opened by multiple devices. They may also know what actions the user has taken with the files (for example, if they made a legitimate copy or that they have legitimately forwarded it). Because the control is maintained, the receiver may also request certain changes to the file specifics from the sender. For example, the receiver may request an additional two viewings of the data for a particular purpose. These can then be approved or denied by the sender.

It should be apparent that effectively the system, as discussed above, provides for a secure file delete by essentially allowing an encrypted version of the secure file (111) to remain on the device, but by making it so that the source file (101) within that secure file (111) cannot be retrieved (decrypted) by the various software on the receiving device without controls on the use of that source file (101) being adhered to. As the secure file (111) does remain, however, in an embodiment, this can allow for a legitimate third party (such as law enforcement personnel) to access the remains of the source file (101) with assistance from those in control of the systems and methods of the present case and the secure server.

While the principle use of the system and methods discussed above is to allow a sender to maintain control of data after it has been sent so that private data does not get forwarded, copied, or viewed without their permission, it should be apparent that the ability to place controls on data can provide for additional functionality to the data. For example, if data is intended for a specific use, the data can be used to control physical actions of the receiver, to provide accurate indications of send and received times, and to provide the sender with consumption information on the file.

A couple of exemplary uses of the file system without the use of secured data are also provided. In one, the system could be used to provide a notification of the ability to be seated at a restaurant. A restaurant could send a file that can only be opened within a 3 minute window after it is sent. If the file is opened, the restaurant is notified that the user received it and (presumably) is on their way to be seated. It may even allow an indication of their current location. If the file is not opened, the held table may be lost to another patron. The system can similarly be used for gaming or entertainment purposes where limited instructions could be provided to a device, which could only be opened in a particular time window and/or in a particular place to provide for a "treasure hunt" style game. A security-based example of this could be used to provide for transfer of sensitive military documents. Specifically, if a sensitive military document resides on a laptop that is GPS enabled, constraints would be put on a file that would only allow for the file to be opened while in the geographical region of a secure military base, building, room, or area if the laptop is not otherwise connected to a secure network.

In a still further embodiment, there will be the ability for the originator of a source file (101) to send multiple secure files (111) each with different attributes simultaneously and to potentially different parties. An example of this would be for a teacher to send out an entire semester's worth of take home tests at once that only open on the date and in the window of when each test should be individually taken. As each test is taken, the files are then sent back to the teacher and removed from the original encrypted file set.

While the above discussion generally contemplates the sending and receiving of data between two machines, it should be recognized that while this underlying framework is used by all forms of computer networking and interaction, certain types of interaction can allow for additional functionality to be provided to the system. One example relates to server portal style systems where the functionality may be provided via interactive software such as a browser "plug-in" or add-on. This may be the case in conjunction with a variety of social networking sites including general social networking sites such as, but not limited to, MySpace™ Facebook™, Google+™, LinkedIn™, or Twitter™ or specialized social networking sites such as, but not limited to, Untappd™, Sermo™, AllNurses.com™, or Martindale.com™

In many social networking sites, there may be concern about having the ability to post controlled data (and specifically images) without letting everyone who can view your account know that you have posted sensitive data. In the case of a picture image, for an example, if a young adult is at a drinking party where there are a number of friends at the party, the young adult doesn't want their parents, church friends, or employer to see the image of the drinking party or to even know that such a picture is even posted to their account (or a friend's account). In this case, the fact that the user has posted a secure file (111) to their account could trigger suspicion and could result in a viewer of the secure file (111) (even though they have no idea what is in the source file (101)) to demand access or to try to hack the secure file (111) to attempt to get at the encrypted file knowing that it is potentially of enhanced interest. Essentially, the posts of a secure file (111) provides a potential incentive to get access to the source file (101) or determine what may be in it.

In this case the system can create a variation on the standard file format including an unencrypted portion. This type of file not only includes the standard encrypted secure file (111) as discussed above, but also includes an infused image in the secure file (111) which is not encrypted. The infused image would display on the social networking site showing a completely separate and possibly unrelated image to the originally encrypted image, a portion of the file, or an altered image with sensitive data removed.

The existence of further source file (101) associated with the infused image is generally hidden. Users who are specifically approved to see the underlying encrypted source file (101) could see a small, possibly animated indicator on the displayed infused image or may see a different image, or may see a watermark or other indicator on the infused image to trigger that there is a hidden source file (101). The indicator may be connected with the infused image being accessed by a particular user so may only appear if the user opens the infused image out of a thumbnail, for example. Upon mousing over or clicking on the infused image, the secure file (111) decryption would occur and the source file (101) would then display, or the user would be requested to provide further authentication to download the secure file (111) for later access. This embodiment provides that one image is displayed for the general public while authorized individuals would see the hidden image thus hiding even the existence of the secure file (111) from those not authorized or intended to view its contents.

Display of an image via a thumbnail or related "preview" can also cause problems if the image is of the contents because the thumbnail is effectively a small version of the same image and therefore could potentially be copied, enlarged, and used as a substitute for the encrypted file. In an embodiment, the user will have the option to choose if they want a thumbnail image while selecting other file constraints. The user will then be given a pop-up of the image and the ability to zoom, crop, or black any portion of the original image to be used as the thumbnail. An example of this would be in a personal image, a sender may want to crop the original image down to just a pair of eyes, a partial shot, or even a part of the background to be used as the thumbnail image. Once the selection has been made, the application will then build a small sized image separately to be used as the thumb nail. This may then be an infused image in the secure file (111). Using an embedding schema, instead of the end file creating a readable image file of the thumbnail image with the rest of the secure file (111) attached to the end of the thumbnail file, but not impeding the viewing of the thumbnail image. Regular image viewing software will ignore the attached encrypted full file and only display the thumbnail image. Such a system will therefore allow the thumbnail to be treated as a regular image file with a hidden payload. This type of methodology will also allow the file to work with social media sites while still protecting the original file even though it has it attached and may be carried with manipulation of the infused image file.

In a still further embodiment, there may be the option to allow social media sites to have unlimited access to open and display the source file (101), but if a person were to try and download the file from the social media site, it would have all of the preset constraints and be supplied only in secure file (101) form. A method to accomplish this would be with a thumbnail image as previous discussed. The file owner would be notified that a file has been downloaded and who accessed it allowing them to know that the secure file (111) has been copied and by whom. They can then grant or deny access to the underlying source file (101) as they see fit.

In a still further embodiment it should be recognized that the attachment of additional files (such as the thumbnail images discussed above) is not limited to the use of image files. There can be an ability to add comments to a secure file (111) as a preview to actually decrypting and viewing the source file (101). This may be done through adding a free text field in the metadata file. An example of this would be as the file is executed, the application will pause before decrypting the file, then display the comment and allow the user to either continue or leave off for later and not view of the unencrypted file. In such a way the file creator can provide information to the potential user of the controls on the source file (101). In this way, if the source file (101) is useable only once, for example, the user will know not to open it when they may not be able to actually view it due to device or time constraints.

It can also be desirable that a user allow access to a predefined group. These are predefined groups that could be assigned the analogy of a season pass. In such cases, the members of the group would be allowed all privileges to view the files from a particular send. While social networking comes to mind immediately in association with this type of configuration, this could also be used as a parental control with parents having access to all files that are sent from a minor child's device and it can be used in collaborative work groups. Members of the groups would be able to view all the source files (101) without view constraints, but not necessarily have the ability to forward outside of the group or copy the files, depending on the originator's configuration settings.

Altering of group membership may be unilateral by a group owner, unilateral by a group member (such as for example in the parental control situation) or allowing new members into a group would require the unanimous consent of all current members and dismissing a member would require a majority, or any such configurable arrangement.

The later could be particularly desirable for a group that may be engaged in a confidential activity (for example development of a new invention) where they can share confidential information securely with each other, without worry that a group member may "go rogue" or an unauthorized person could be added without general knowledge of the group. Further, in such a group situation, the group as a whole may control ownership and rights to the source file (101) with no individual member able to act unilaterally. In this situation, the actual secure file (111) may be stored on a central system where the group all has access (for example a university's central server or on a public cloud server) to avoid having any individual have control of the information. As further contemplated elsewhere in this document, the server which actually hosts the secure file (111) may have no access to its contents as the server does not have the keys which are under the control of group members. This can provide not only group access, but further security of files when stored in conjunction with current "cloud" computing systems and methodologies.

The central storage methodology, particularly where the host has no access to the contents of the secure file (111) can be particularly desirable in situations where a user's device may lack sufficient memory to support all functions or where a user wants to utilize the encryption system for a significant amount of data. In this situation, it can be possible to place the file on a remote secure server where the files are stored encrypted and where the originator's device has a key to identify them as the originator. This can allow a user to monitor all of their files, constraints, and people the file was sent to, allowing an originator to change the constraints of all of their files easily and from a centralized location. This function would also allow a receiver to view their inbound files and a briefing of the constraints attached to their inbound files. This would generally be an Internet based solution where a central operator operates a website that services all traffic and gives details of all files which the creator has.

In an embodiment, such a central storage without access can be created in a "software as a service" type of arrangement. In this arrangement, the user would generally upload their source file (101) to be encrypted to a central server (generally utilizing some form of secure communication). The server would then create the secure file (111) and send that back to the original sender packaged so as to provide them with ownership of the file (as discussed later). The central server can then securely delete the unencrypted source file (101) by repeated overwriting or other related technology as is well known to those of ordinary skill In an alternative embodiment, memory methodologies which are not persistent can be used and the central server can disengage the memory sections to cause loss of data. The user would then be able to upload the secure file (111) to a different section of the central server which is tasked with persistent storage where they would have a file account or similar storage available to them.

While the above discussion generally contemplates file deletion based upon loss of control of a file, it should be recognized that the above systems and methods can also provide for certain benefits related to file "ownership." That is specifically identifying who creates or owns the contents of the source file (101). In an embodiment, the system can allow a user to claim ownership of the source file (101) in the name of the originator and assist with the originator's copyright claims by starting the paperwork, directing them to the correct information resources, or even filing paperwork for a user over the internet. Specifically, because the encryption is controlled by the original creator of the work, and the specifics of creation can be encoded into the secure file (111), the secure file (111) can act as a legally self-authenticating piece of evidence to show creation and/or ownership of the source file (101) embodied in the secure file (111). Copyright assistance will also be gained through claiming copyright in the metadata and doing copyright stamps directly on the image and/or watermarks which can provide further legal protection to the source file (101), as well as further evidentiary benefits.

In a still further embodiment, the systems and methods can assist with ownership and transfers of documents. Specifically, an embodiment can allow for secure transfer of ownership to someone other than the file creator. One such exemplary case of this would be where someone is allowed to take a picture only if they transfer the rights of the image to the person in the picture or a different third party. Legally, this could be the case in a "work made for hire" or if certain rights of publicity may be relevant to the work. In a case of taking a picture of someone who does not want their image to be posted on the Internet, the originator takes the picture, transfers ownership of the source file (101) to the person in the picture via a secure file (111) transfer, and that person can then send a view-only file back to the originator. This methodology would also be useful for people who originate other types of documents but do not have ownership claims of the contents, like lawyers, technical writers, and contracted photographers. After the ownership has been transferred to a new party, the original copy may be automatically destroyed. However, certain rights in the picture (for example a portfolio right which denies making copies but allows for certain forms of display) can be retained. In effect, it is possible for the system to act as part of a digital rights management framework where the ability to only utilize a work within the confines of a specific license are technologically enforced.

It should be clear that the ability to maintain control over data can present certain concerning situations where absolute control should not be granted. For example, the system could be used to conceal criminal action. In order to hinder such use, it can be possible to create a secure backdoor to access the file should it become necessary to do so based on specific legal proceedings, national emergency, or other threat. In these circumstances it can be the case that a decryption key can be stored in a secure location for a limited period of time, or that, upon receipt of a valid court order for monitoring, such storage of secure keys can be further implemented to allow secure monitoring of a user's use of the system.

In less threatening situations, but ones where behavior of a minor needs to be monitored by a parent, for example, image recognition software or other software functions may be provided that can identify and flag potentially problematic sends. E.g. software which is capable of identifying nudity can be used. This can then trigger an oversight (such as parental access to the send) and/or automatically prevent sending. This would be a parental control and one of many different additional functions that can be added as such functionality is needed.

While the invention has been disclosed in conjunction with a description of certain embodiments, including those that are currently believed to be the preferred embodiments, the detailed description is intended to be illustrative and should not be understood to limit the scope of the present disclosure. As would be understood by one of ordinary skill in the art, embodiments other than those described in detail herein are encompassed by the present invention. Modifications and variations of the described embodiments may be made without departing from the spirit and scope of the invention.

The invention claimed is:

1. A method for creating an encrypted computer file, the method comprising:
   providing a source file to a sending component on a first computer;
   said sending component attaching metadata to said source file where said metadata identifies specifics about how said source file may be used;
   said sending component encrypting said source file using a first key;
   said sending component encrypting said metadata using a second key, different from said first key;
   said sending component combining said encrypted source file, said encrypted metadata file, said first key, and said second key into a secure file in accordance with an algorithm, which mixes components of said encrypted source file, said metadata file, said first key, and said second key together; and
   transmitting said secure file with a wrapper file which includes a location of said first key, a location of said second key, and which records at least one aspect of a transmission of said secure file;
   wherein, when said metadata file is decrypted by a receiving component using said second key, if said specifics of how said source file may be used are not met, said receiving component does not retrieve said first key from said source file; and
   wherein said retrieving component deletes the location of the first key from said wrapper file.

2. The method of claim 1 wherein said first key is combined with said metadata prior to said metadata being encrypted.

3. The method of claim 1 wherein said secure file is password protected.

4. The method of claim 1 wherein said metadata includes a limitation on the number of times the source file can be opened.

5. The method of claim 1 wherein said metadata includes a limitation on the time when the source file can be opened.

6. The method of claim 1 wherein said metadata includes a limitation on the location where the source file can be opened.

7. The method of claim 1 wherein said metadata prohibits making a copy of the source file.

8. The method of claim 1 wherein said source file comprises an image.

9. The method of claim 1 which said encryption is AES 256 bit encryption.

10. A method for providing secure digital communication, the method comprising:
    providing a source file to a sending component on a first computer;
    said sending component attaching metadata to said source file where said metadata identifies specifics about how said source file may be used;
    said sending component encrypting said source file using a first key;
    said sending component encrypting said metadata using a second key, different from said first key;
    said sending component combining said encrypted source file, said encrypted metadata file, said first key, and said second key into a secure file in accordance with an algorithm, which mixes components of said encrypted source file, said metadata file, said first key, and said second key together;
    said first computer transmitting said secure file to a second computer;
    a receiving component on said second computer receiving said secure file;
    said receiving component obtaining said second key from said source file and
    utilizing said second key to decrypt said metadata;
    if said specifics about how said source file may be used are currently met,
       said receiving component retrieving said first key from said source file and decrypting said source file; and
       said receiving component displaying said source file in a framework which does not allow said specifics about how said source file may be used to be violated;
    if said specifics about how said source file may be used are not currently met,
    said receiving component losing said second key.

11. The method of claim 10 wherein said source file comprises an image.

12. The method of claim 10 wherein said metadata includes a limitation on the number of times the source file can be opened.

13. The method of claim 10 wherein said metadata includes a limitation on the time when the source file can be opened.

14. The method of claim 10 wherein said metadata includes a limitation on the location where the source file can be opened.

15. The method of claim 10 wherein said metadata prohibits making a copy of the source file.

16. A computer readable memory comprising:
    computer readable instructions for obtaining a source file;
    computer readable instructions for attaching metadata to said source file where said metadata identifies specifics about how said source file may be used;
    computer readable instructions for encrypting said source file using a first key;
    computer readable instructions for encrypting said metadata using a second key, different from said first key;
    computer readable instructions for combining said encrypted source file, said encrypted metadata file, said first key, and said second key into a secure file in accordance with an algorithm, which mixes components of said encrypted source file, said metadata file, said first key, and said second key together;
    computer readable instructions for transmitting said secure file with a wrapper file which includes a location of said first key, a location of said second key, and which records at least one aspect of a transmission of said secure file;
    computer readable instructions for decrypting said metadata file using said second key, wherein if said specifics of how said source file may be used are not met:
    said first key is not retrieved from said source file; and
    the location of the first key is deleted from said wrapper file.

17. The method of claim 1 wherein, said specifics of how said source file may be used are compared to said at least one aspect of said transmission of said secure file to determine if said specifics on how said source file may be used are met.

* * * * *